Aug. 15, 1967  D. W. DANIEL  3,335,639
METHOD AND APPARATUS FOR PRODUCING A SHAVING CUTTER
Filed Nov. 14, 1966  3 Sheets-Sheet 1
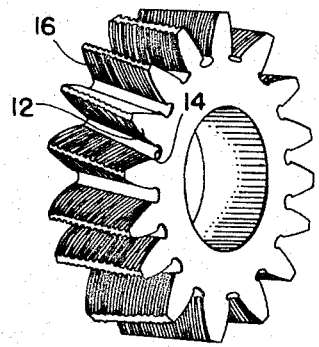
FIG. 1
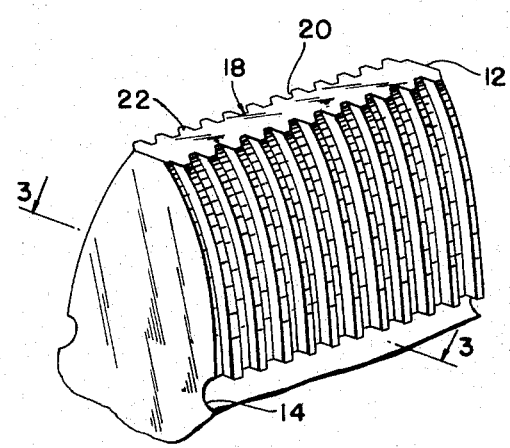
FIG. 2
FIG. 3
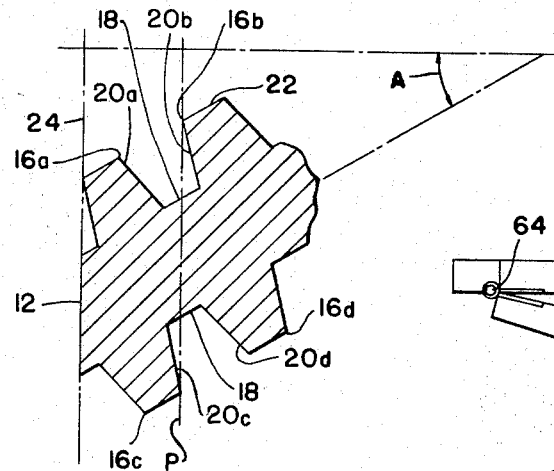
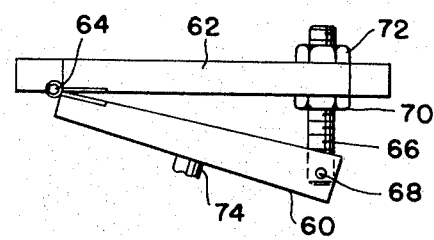
FIG. 6
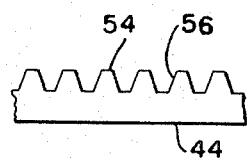
FIG. 5
INVENTOR
DAVID W. DANIEL
BY Whittemore, Hulbert
& Belknap ATTORNEYS

INVENTOR
DAVID W. DANIEL

United States Patent Office 3,335,639
Patented Aug. 15, 1967

3,335,639
METHOD AND APPARATUS FOR PRODUCING A SHAVING CUTTER
David W. Daniel, Birmingham, Mich., assignor to National Broach & Machine Company, Detroit, Mich., a corporation of Michigan
Filed Nov. 14, 1966, Ser. No. 593,926
10 Claims. (Cl. 90—24)

The present application is a continuation-in-part of my copending application Ser. No. 424,623, filed Jan. 11, 1965 and now Patent No. 3,300,833 (which is a continuation-in-part of my prior application Ser. No. 201,344 filed June 11, 1962 and now abandoned).

The present invention relates to a method and apparatus for producing a shaving cutter. The shaving cutter which is produced by the method and apparatus disclosed herein is in the form of a helical gear having its teeth provided with grooves or serrations which extend substantially perpendicular to the axis of the shaving cutter, or in other words, which substantially occupy planes in which the shaving cutter rolls.

As disclosed in my prior copending application Ser. No. 424,623, it has been found that when the side walls of these grooves or serrations are inclined so as to intersect the flanks of the teeth of the shaving cutter to provide substantially equal slightly obtuse included angles, the cutting edges formed by the intersection of these surfaces operate to produce substantially equal cutting at all times when the shaving cutter is rotated in tight mesh at crossed axes relationship with a work gear. Of course, due to the crossed axes relationship only half of the cutting edges on the teeth of the shaving cutter are moving in a direction to perform a cutting action at any one time. However, irrespective of the direction of rotation, the cutting edges operating on the driving side of the shaving cutter tooth produce substantially equal cutting as the cutting edges at the coast side of the teeth of the shaving cutter.

In crossed axes gear shaving as has been practiced over the years, a shaving operation ordinarily consisted of rotating the shaving cutter and tool in tight mesh in one direction while providing a relative traverse between the shaving cutter and gear in a direction parallel to the axis of the work gear of having a component parallel to the axis of the work gear, so as to distribute the cutting action of the shaving cutter uniformly from end to end of the teeth of the work gear. Ordinarily, the direction of rotation was reversed after each traverse stroke and a reverse stroke of traverse taken in the opposite direction. This of course involved a substantial period of time during which the relative traverse took place and furthermore, it required a reversal in the direction of rotation of the gear and cutter.

Applicant discovered that when the shaving cutter was provided with helical teeth having grooves or serrations arranged to provide substantially equal obtuse included angle cutting edges at both sides of each groove or serration, a shaving method could be performed in which the cutter and gear, while being rotated, were fed radially towards each other wtihout providing relative traverse and that the teeth of the gear could be shaved with substantially equal effectiveness on both sides thereof without reversing the direction of rotation. This operation has been referred to as plunge cutting and the novel shaving cutter disclosed in the aforesaid prior copending application permits this operation to be carried out commercially.

Difficulties were encountered in providing the necessary equal obtuse included angle cutting edges on helical teeth because the result, as will be disclosed more fully hereinafter, is the provision of an undercut surface in the serration, considered from the pane of rotation of the shaving cutter.

In accordance with the present invention a shaving cutter and a serrating cutter are mounted in a particular way relative to each other and are provided with a particular realtive feeding movement which produces the required substantially equal obtuse included angle cutting edges in a simple serrating operation.

Accordingly, it is an object of the present invention to provide a method and apparatus for serrating the teeth of a shaving tool in which a serrating tool in the form of a ribbed blade having cutting edges at one edge is moved in a circular arc in a plane oblique to the plane of the shaving cutter and is given a depth feed during its oscillation back and forth in circular arcs in a direction perpendicular to the plane in which the serrating blade is oscillated.

More specifically, it is an object of the present invention to provide for serration of a shaving cutter by inclining the gear shaving cutter at an angle with respect to the plane containing the path of movement of a serrating blade such that the cutting action of the blade produces grooves or serrations in the shaving cutter having the sides thereof inclined to produce substantially equal included angle cutting edges at both sides of the grooves or serrations defined between the side walls of the grooves or serrations and the flanks of the teeth.

Other objects and features of the invention will become apparent as the description proceeds, especially when taken in conjunction with the accompanying drawings, illustrating preferred embodiments of the invention, wherein:

FIGURE 1 is a perspective view of a gear shaving cutter of the type disclosed herein.

FIGURE 2 is an enlarged perspective view of a single tooth of such cutter.

FIGURE 3 is an enlarged fragmentary sectional view on the line 3—3, FIGURE 2, illustrating the cross-sectional shape of the grooves or serrations.

FIGURE 5 is a fragmentary sectional view on the line 5—5, FIGURE 4.

FIGURE 6 is a fragmentary view showing an adjustable support plate.

Figure 4:
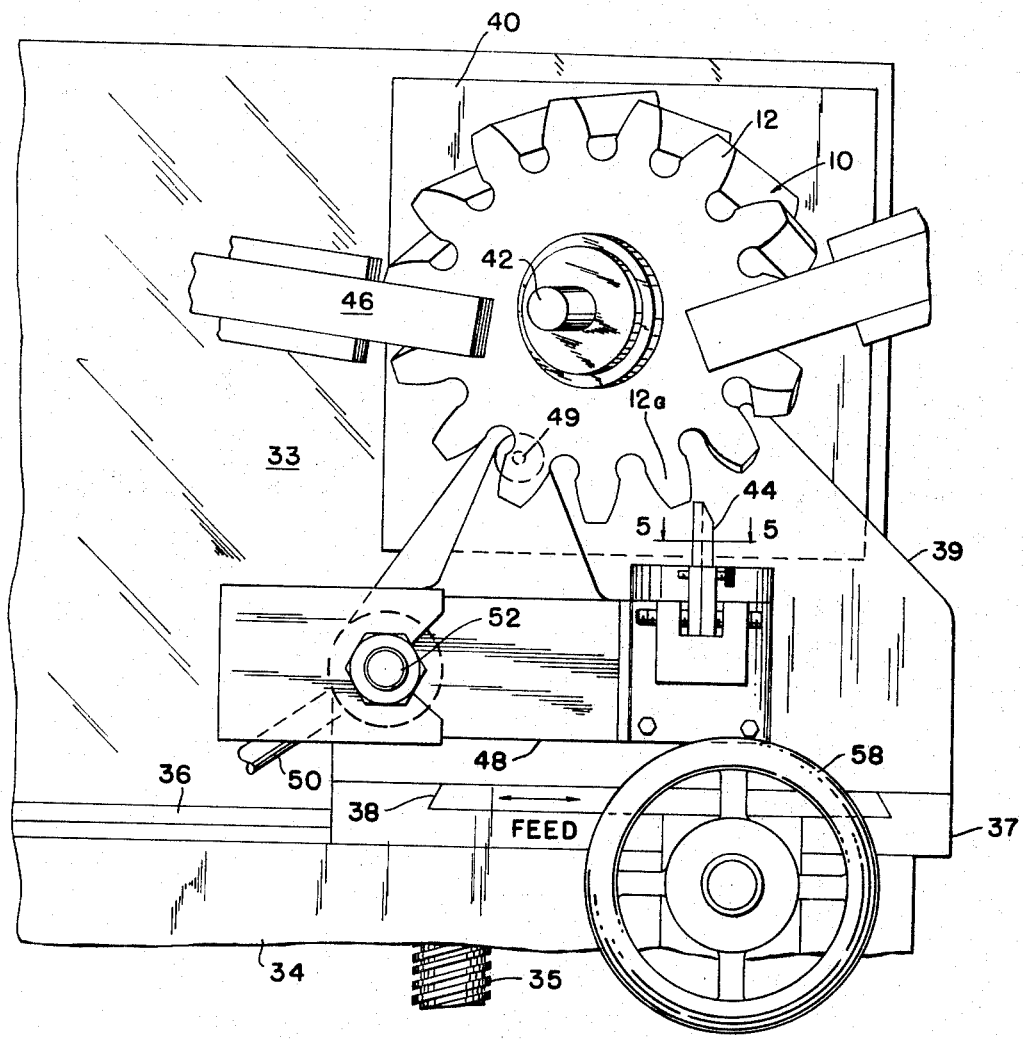
FIGURE 4 is an elevational view of the apparatus for performing the serrating operation.

Referring now to FIGURES 1 and 2, the gear shaving cutter is illustrated at 10 and is in the form of a gear having helical teeth 12 normally of involute form, the roots of the teeth being provided with generally circular cross-section undercut surfaces 14. The flanks of the teeth are provided with a multiplicity of cutting edges indicated at 16, these cutting edges being provided by the grooves or serrations 18, the side walls 20 of which intersect the flank surfaces 22 to provide the cutting edges generally designated 16.

Referring now more particularly to FIGURE 3, the shape of the grooves or serrations 18 is shown. In this figure an end portion of the tooth 12 is shown in section along the line 3—3, the side surface of the gear being indicated by the line 24 and the helix angle of the gear by the angle A. The side surfaces of the grooves or serrations 18 are in this figure, separately designated as 20a, 20b, 20c and 20d. The flank surfaces of the teeth extending between adjacent serrations is shown in the figure at 22. The cutting edges designated generally at 16 are in this figure, separately designated 16a, 16b, 16c and 16d. Since the line 24 represents an end surface of the gear shaving cutter, it will be appreciated that any line parallel to the line 24, such as the line P, designates a plane of roll of the shaving cutter when it is rotated on its axis.

It will be observed in FIGURE 3 that the included angles of the cutting edges 16a, 16b, 16c and 16d are all substantially equal and are all slightly obtuse. In this figure the included angle is illustrated as somewhat larger than normally desired for purposes of clarity. In practice, it is preferred to have the included angle defined between surfaces 20 and 22 to be between 100 and 105 degrees, and excellent results are obtained when the included angle of all cutting edges is about 105 degrees.

In FIGURE 3 it will be observed that the surfaces 20b and 20c are undercut with reference to an adjacent plane of roll P. It is desirable for all of the cutting edges generally designated 16 to extend as nearly as possible in a plane perpendicular to the axis of the cutter, or in other words, in planes of roll. This leads to complications in the manufacture of the cutter because of the difficulty of producing this undercut surface.

Prior to the present invention gear shaving cutters have been serrated by an operation in which a serrating blade is provided having ribs at one side thereof intersecting an end surface of the blade to provide cutting edges. This blade was positioned for oscillation in a circular arc about an axis parallel to the axis of the cutter but located at the approximate center of curvature of the involute surface of a tooth. The blade was then oscillated about its axis and given a depthwise feed in a direction perpendicular to its axis until the serrations had been formed to the required depth. It will be appreciated that the cutting stroke initiated at the crest of the shaving cutter teeth and terminated with the cutting edges of the serrating blade located in the undercut root portion of the tooth designated 14. However, this operation cannot be performed to provide the undercut surfaces 20b and 20c as illustrated in FIGURE 3.

In order to produce the undercut surfaces and at the same time to maintain the cutting edges in or substantially in the required planes of rotation, a method is carried out which as illustrated herein involves the use of the apparatus shown in FIGURE 4. The cutter is supported at an oblique angle determined basically by the helix angle of the teeth 12 of the cutter.

The serrating apparatus comprises a frame 33 carrying a table 34 for vertical adjustment thereon by suitable means such for example as the vertical feed screw 35. The table 34 is provided with horizontal ways 36 in which is adjustable a slide 37 which in turn is provided with transversely extending horizontal ways 38. Mounted in the ways 38 for horizontal movement is a bracket 39. An angle block 40 having a spindle 42 thereon is secured to frame 33. The cutter 10 is mounted on the spindle 42 and is clamped in position with a selected tooth thereof indicated at 12a in position to be engaged by a serrating blade 44. The cutter 10 is clamped to the angle block 40 by suitable clamps indicated at 46.

The serrating tool 44 is adjustably carried at one end of an arm 48 which is pivoted to a pivot support 49 carried by the bracket 39. Oscillation is imparted to the arm 48 by suitable means such for example as the connecting rod 50 having a pivot connection 52 to the arm 48.

It will be understood that an involute, such as the involute surfaces at the sides of the teeth 12, closely approximate an arc and the axis of the pivot mounting 49 is positioned such that the cutting edges of the serrating tool move in arcs closely approximately the involute surfaces of the teeth.

At one end of the arm 48 there is provided the serrating blade 44, the blade being suitably positioned by means subsequently to be described.

The blade may have a cross-sectional shape illustrated in FIGURE 5, where it will be observed that the blade proper includes ribs 54 separated by grooves 56. The side walls of the grooves converge inwardly at a small angle as shown, this of course resulting in the opposite side walls of each rib converging outwardly at the same small angle.

The cutting edges are formed by grinding off the end of the blade at an appropriate angle and as the blade is oscillated about the axis of the pivot support 49, the bracket 39 is given a depth-wise feed as illustrated in the figure by appropriate horizontal feed mechanism including the hand wheel 58.

It will be observed in FIGURE 4 that the location of the particular tooth here designated 12a which is being serrated by the blade 44 is located to the right of a vertical line passing through the plane containing the axis of the cutter 10. The set-up position is selected such that the serrating blade cuts grooves or serrations which are substantially parallel to the sides of the cutter, this position being illustrated in FIGURE 4. By adjusting the slide 37 to the right and by rotating the cutter 10 to bring the blade 44 into coaction with the tooth 12a at the proper position, the blade when oscillated and fed to the left will produce tapered serrations having side walls inclined to intersect the flanks of the teeth in substantially equal obtuse included angle cutting edges. A cutting operation is performed at both sides of each groove as a form-cutting operation in which the side of each rib cuts to its full depth.

In describing the machine shown in FIGURE 4 the support for the gear shaving cutter was described merely as a plate or angle block 40. In order to provide a machine which can be adjusted to provide the required serrations on gear shaving cutters of different helix angle and different diameter, the bracket 39 which carries the arm 48, which in turn mounts the serrating blade 44, is horizontally slidable on the table 34 which in turn is vertically adjustable by suitable mechanism comprising the feed screw 35 to accommodate gear shaving cutters of different diameter. In order to accommodate gear shaving cutters of different helix angle it is preferred to provide an adjustable angle plate 60 which is hinged to a plate 62 as indicated at 64. It will be understood that the plate 62 is adapted to be secured flat against the frame 33 so that as viewed in FIGURE 4 the plate 62 would be parallel to the plane of the paper. The angularity of the plate 60 is adjustable by suitable means such for example as a screw shaft 66 pivoted as indicated at 68 to the angle plate 60 and extending through a slot in the mounting plate 62. The parts are retained in adjusted position by means of clamping nuts 70 and 72. The angle plate 60 is provided with an arbor 74 on which the gear shaving cutter is mounted.

With the foregoing construction it is obvious that the gear shaving cutter may be mounted at an angle appropriate to its helix angle and that the serrating blade may be adjusted both vertically and horizontally to engage the tooth 12a in a position such that the grooves or serrations produced by the ribs 54 of the serrating cutter extend substantially in the plane of roll of the gear shaving cutter or in other words, perpendicular to its axis, and at the same time the side walls of the grooves or serrations are suitably formed to define substantially equal obtuse included angle cutting edges with the flank surfaces of the teeth of the gear shaving cutter.

In the method described in the foregoing and carried out by the operation of the apparatus illustrated in FIGURE 4, it will be observed that both side surfaces 20 of the individual grooves or serrations 18 are form cut as distinguished from being generated.

Referring now to FIGURES 7–11 there is illustrated a set up in which one side 20 of the grooves is form cut and the opposite side is generated.

Figure 7:
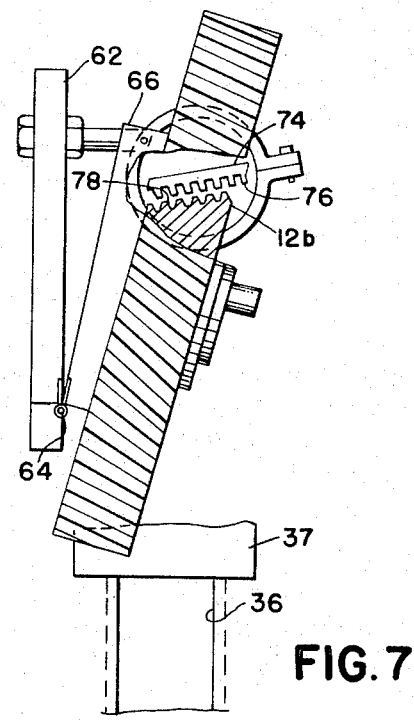
FIGURE 7 is a diagramamtic view illustrating a modified setup of the apparatus.

Referring first to FIGURE 7 it will be observed that the plate 60 is swung about the axis 64 relative to the fixed plate 62 such that the tooth undergoing serration, designated in this figure at 12b, extends generally at an oblique angle to the plane of the plate 62. Specifically, the angularity of the cutter is adjusted such that the direction of feed of the serrating blade, which in this figure is diagrammatically illustrated at 74, will cause one corner of each rib 76 on the blade to generate a side surface of a groove or serration 78 on the side of the tooth 12b of the cutter. In FIGURE 7 the ways 36 are illustrated along which the slide 37 is adjustable and this of course determines the direction of feed of the serrating blade as it is oscillated back and forth in its arcuate path to perform the grooving or serrating operation.

Figure 11:
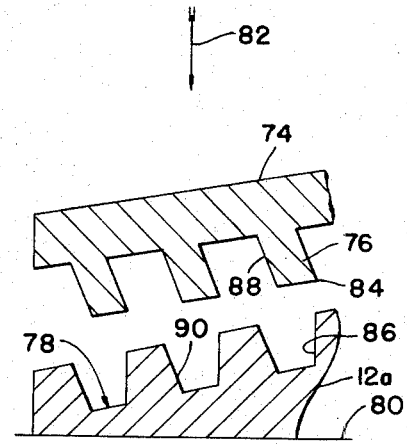
FIGURE 11 is a detailed sectional view of a modified serrating blade associated with a cutter tooth.
Figure 9:
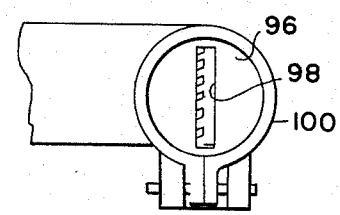
FIGURE 9 is a plan view of the structure shown in FIGURE 8.
Figure 8:
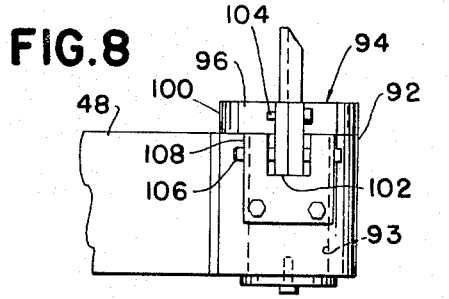
FIGURE 8 is a fragmentary elevational view of the arm carrying the serrating blade.
Figure 10:
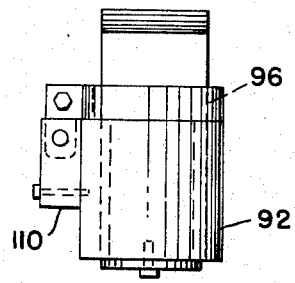
FIGURE 10 is a side view of the structure shown in FIGURE 8.

Referring now to FIGURE 11 the relationship between the serrating blade 44 and the cutter tooth 12a is illustrated in diagrammatic fashion and in enlarged form. In this figure it will be assumed that the serrating blade 74 is oscillated in an arcuate path about an axis parallel to the line 80. The depthwise feed of the serrating blade accomplished by the hand wheel 58 is in the direction of the arrow 82. It will be observed that the arrow 82 is inclined with respect to the direction in which the tooth 12a extends. Accordingly, as the serrating blade is oscillated and fed in the direction of the arrow 82 the corners 84 of the ribs 76 generate the groove surfaces 86. On the other hand, the cutting edge defined by the intersection between the side 88 of the rib 76 and the end of the blade, produces a form cutting action to form the side wall 90 of the grooves or serrations 78. With this arrangement the problem of chip formation and disposal is simplified and at the same time by appropriate set-up positioning of the parts, the grooves or serrations 78 may be caused to extend parallel to the sides of the cutter, or in other words, substantially in planes of roll of the cutter, while at the same time forming cutting edges characterized by substantially equal, slightly obtuse included angle cutting edges.

In FIGURE 7 it will be observed that the serrating blade 74 is disposed at an oblique angle with respect to the support arm 48. The structure for providing this adjustment will be apparent upon a consideration of FIGURES 8–10. As seen in these figures the arm 48 is provided at one end with an enlarged head 92 having an opening 93 therethrough for receiving the cylindrical body portion of the blade holder 94, the holder including a radially extending flange 96 which rests upon the upper surface of the head 92. The holder 94 includes an elongated opening 98 in which the serrating blade 74 is suitably received.

From the foregoing it will be apparent that the angularity of the blade may be adjusted about the axis of the cylindrical opening 93. In order to provide for exact adjustment of angularity of the blade, there is provided a split ring 100 having depending ears 102 adapted to be clamped together by suitable clamping means 104. When the clamping means 104 is released, the holder 94 may be adjusted relative to the ring 100. After it has been adjusted into approximate position, the clamping means 104 is tightened and thereafter exact adjustment of the blade in the recess or opening 98 is accomplished by adjustable abutment screws 106 extending through ears 108 provided in a bracket 110 secured to one side of the head 92.

With this construction set-up of the apparatus for producing the required serrations is facilitated. In setting up, the cutter is positioned such that the projected helix angle of the tooth which is being worked on is at an oblique angle to the direction of feed of the serrating tool, this angle being substantially equal to the obtuse included angle desired on the cutting edges of the shaving tool.

The drawings and the foregoing specification constitute a description of the improved method and apparatus for producing a shaving cutter, in such full, clear, concise and exact terms as to enable any person skilled in the art to practice the invention, the scope of which is indicated by the appended claims.

What I claim as my invention is:

1. Serrating apparatus for forming parallel grooves in the flanks of the teeth of a helical gear-like shaving tool in which said grooves are parallel to the plane of said tool, the side walls of which grooves intersect the flanks of said teeth to form cutting edges having substantially equal slightly obtuse included angles, comprising a frame establishing a reference plane, a support on said frame, means for adjusting said support on said frame in a first direction parallel to said reference plane, a slide on said support, means for adjusting and feeding said slide on said support in a second direction parallel to said reference plane and perpendicular to said first direction, a serrating blade on said slide, means for oscillating said blade on said slide in a substantially involute path in a plane parallel to said reference plane, said blade having groove-cutting ribs having cutting edges extending generally transverse to the plane in which said blade moves, and support means on said frame including means for positioning a tool to be serrated with the plane of said tool inclined to said reference plane at an angle determined by its helix angle.

2. Apparatus as defined in claim 1 in which said tool support means is arranged to position the plane of the gear shaving tool to intersect the reference plane in a line perpendicular to the direction of feed and adjustment of said slide.

3. Apparatus as defined in claim 1 in which the means for oscillating said blade comprises an arm pivoted about an axis perpendicular to said reference plane.

4. Apparatus as defined in claim 1 in which said tool support means comprises an arbor, and an angularly adjustable plate carrying said arbor for adjustment to the angle required by the helix angle of the gear.

5. Apparatus as defined in claim 1 comprising means for adjusting said support in a third direction perpendicular to both said first and second directions.

6. Serrating apparatus for forming grooves in the flanks of the teeth of a helical gear-like gear shaving tool in which said grooves are parallel to the plane of said tool, the side walls of which grooves intersect the flanks of said teeth to form cutting edges having substantially equal slightly obtuse included angles, comprising a frame, a table adjustable vertically on said frame, a horizontally movable slide on said table, an arm pivoted to said slide for oscillation about a horizontal axis perpendicular to the direction of movement of said slide, a serrating blade on said arm having groove-cutting ribs having cutting edges arranged to extend generally parallel to its axis, a tool support on said frame including means mounting a tool for rotary adjustment about a horizontal axis into proper position in a vertical plane inclined to the vertical plane in which said arm oscillates.

7. The method of cutting grooves to form serrations in the teeth of a helical gear-like gear shaving tool in which said grooves are parallel to the plane of said tool, the side walls of which grooves intersect the flanks of said teeth to form cutting edges having substantially equal slightly obtuse included angles, which comprises oscillating a serrating blade in a generally involute path occupying a reference plane, the blade having a plurality of groove-cutting ribs extending generally transverse to the direction of movement of said blade, positioning the tool in a plane inclined to said reference plane at an angle dependent on the helix angle of said tool, and effecting a depth feed between said tool and blade in a direction parallel to the said reference plane.

8. The method as defined in claim 7 which comprises oscillating said blade in an arcuate path, and which comprises positioning the axis about which said blade oscillates by adjustment thereof in any direction in said reference plane to contact a tooth flank of said tool in position to form the grooves therein parallel to the plane of the gear.

9. The method as defined in claim 7 which comprises positioning said tool relative to the reference plane and forming the side walls of the ribs on said blade such that the cutting edges on said ribs generate the walls at one side of the grooves in the teeth of said tool, and form-cut the walls at the other side of said grooves.

10. The method as defined in claim 9 in which the side walls of the ribs on said blade are parallel.

No references cited.

WILLIAM W. DYER, JR., *Primary Examiner.*

G. A. DOST, *Assistant Examiner.*